US009245156B2

(12) United States Patent
Cox et al.

(10) Patent No.: US 9,245,156 B2
(45) Date of Patent: Jan. 26, 2016

(54) PROCESS FOR CAPTURING AND TRANSMITTING WINDOW SCREEN DISPLAY DATA

(71) Applicant: Absolute Software Corporation, Vancouver (CA)

(72) Inventors: Trevor Cox, Vancouver (CA); Damien Loveland, Richmond (CA)

(73) Assignee: Absolute Software Corporation, Vancouver, BC (CA)

( * ) Notice: Subject to any disclaimer, the term of this patent is extended or adjusted under 35 U.S.C. 154(b) by 187 days.

(21) Appl. No.: 14/190,038

(22) Filed: Feb. 25, 2014

(65) Prior Publication Data

US 2014/0182002 A1   Jun. 26, 2014

Related U.S. Application Data

(63) Continuation of application No. 12/614,365, filed on Nov. 6, 2009, now Pat. No. 8,701,013.

(60) Provisional application No. 61/111,884, filed on Nov. 6, 2008.

(51) Int. Cl.
*G06F 21/88* (2013.01)
*G06F 21/30* (2013.01)
*H04M 1/66* (2006.01)
*G06F 21/50* (2013.01)

(52) U.S. Cl.
CPC .............. *G06F 21/88* (2013.01); *G06F 21/305* (2013.01); *G06F 21/50* (2013.01); *H04M 1/66* (2013.01)

(58) Field of Classification Search
CPC ....................................................... G06F 21/88

USPC .......................................................... 715/740
See application file for complete search history.

(56) References Cited

U.S. PATENT DOCUMENTS

| 5,715,174 | A   | * | 2/1998  | Cotichini | G06F 21/313 340/568.2 |
| 5,764,892 | A   | * | 6/1998  | Cain      | G06F 21/313 340/5.5   |
| 5,802,280 | A   | * | 9/1998  | Cotichini | G06F 21/313 340/5.33  |
| 6,244,758 | B1  | * | 6/2001  | Solymar   | G06F 21/313 709/200   |
| 6,269,392 | B1  | * | 7/2001  | Cotichini | G06F 11/006 709/200   |
| 6,300,863 | B1  | * | 10/2001 | Cotichini | G06F 11/006 340/10.42 |
| 6,507,914 | B1  | * | 1/2003  | Cain      | G06F 21/313 709/202   |
| 7,197,559 | B2  | * | 3/2007  | Goldstein | G06F 11/323 709/224   |
| 7,478,436 | B1  | * | 1/2009  | Shieh     | H04L 63/1441 713/185  |
| 2006/0272020 | A1 | * | 11/2006 | Gardner  | G06F 9/4411 726/23    |
| 2007/0168379 | A1 | * | 7/2007  | Patel    | G06F 17/3061          |

(Continued)

OTHER PUBLICATIONS

Examiner's Report dated Jan. 20, 2012 on Canadian Patent Application No. 2,685,479 (of-record in parent application).

*Primary Examiner* — Reza Nabi
(74) *Attorney, Agent, or Firm* — Knobbe, Martens, Olson & Bear, LLP

(57) ABSTRACT

A process is disclosed for capturing screenshots on an electronic device of a user, and for transmitting representations of the captured screenshots to a monitoring system for storage. The captured screenshot data may, for example, be used to recover a device that is lost or stolen.

21 Claims, 2 Drawing Sheets

(56) References Cited

U.S. PATENT DOCUMENTS

| | | | | |
|---|---|---|---|---|
| 2007/0198001 A1* | 8/2007 | Bauch | H04L 67/125 | 606/1 |
| 2007/0250699 A1* | 10/2007 | Dube | G06Q 10/10 | 713/150 |
| 2008/0098219 A1* | 4/2008 | Forte | H04L 63/12 | 713/168 |
| 2008/0216153 A1* | 9/2008 | Aaltonen | G06F 21/31 | 726/3 |
| 2008/0250510 A1* | 10/2008 | Stevens | G06F 21/70 | 726/35 |
| 2008/0282160 A1* | 11/2008 | Tonnison | G06F 9/4443 | 715/704 |
| 2008/0301820 A1* | 12/2008 | Stevens | H04L 63/0846 | 726/28 |
| 2010/0014676 A1* | 1/2010 | McCarthy | G06F 21/552 | 380/277 |
| 2010/0037312 A1* | 2/2010 | Tarkhanyan | G06F 21/88 | 726/16 |
| 2010/0229248 A1* | 9/2010 | Glave | G06F 21/88 | 726/34 |
| 2011/0115621 A1* | 5/2011 | Loveland | G06Q 10/06 | 340/539.13 |

* cited by examiner

PROCESS FOR CAPTURING AND TRANSMITTING WINDOW SCREEN DISPLAY DATA

CROSS-REFERENCE TO RELATED APPLICATIONS

This application is a continuation of U.S. application Ser. No. 12/614,365, filed Nov. 6, 2009, which claims the benefit of U.S. Provisional Patent Appl. No. 61/111,884, filed Nov. 6, 2008, the disclosure of which is hereby fully incorporated by reference.

BACKGROUND

1. Technical Field

The subject matter described herein relates to automated collection of information for facilitating the recovery of stolen electronic devices.

2. Description of the Related Art

Laptops, and increasingly other electronic devices such as cell phones, PDAs, smart phones (e.g., BlackBerry™, iPhone™), memory sticks, personal media devices (e.g. iPod™), gaming devices and personal computers, are being remotely tracked so that they can be recovered in the event of theft. Such tracking may be effected by sending location information to a remote storage site or an email server, from which email can later be retrieved.

In some cases, supplementary information is needed to identify the location more precisely, or to identify the illegitimate user of the stolen device. Supplementary information may, for example, include photos of the thief or the surroundings, or an address that is typed in.

Remote keystroke logging software and remote screenshot capture software exist. A drawback with existing screenshot capture devices is that they require excessive bandwidth to transmit the captured data. This can alert a thief, who then may decide to destroy or discard the stolen device. Another limitation is that the majority of screenshots captured may be worthless, making it a time-consuming task to wade through them looking for vital information. A drawback with keystroke logging devices is that they typically capture all keystrokes without discerning the context in which they are typed. Again, it is a time-consuming task to search for and decipher vital information useful for recovering the stolen device, as the useful information may only amount to less than 1% of the total.

Proprietary information is routinely stored on electronic devices such as personal computers, laptop computers and personal digital assistants, and the need to promptly recover such devices is self-evident. Any improvement in the efficiency of recovering such devices is therefore valuable.

SUMMARY

This summary is not an extensive overview intended to delineate the scope of the subject matter that is described and claimed herein. The summary presents aspects of the subject matter in a simplified form to provide a basic understanding thereof, as a prelude to the detailed description that is presented below.

The subject matter described herein provides a system and method for the conditional capture of screenshots to facilitate the recovery of a stolen electronic device. The screenshots may be complete or partial, and in preferred embodiments identical screenshots are discarded and not transmitted to limit the transmittal of extraneous information and to keep the use of available bandwidth at a minimum.

In one embodiment, a method performed by an electronic host device to facilitate recovery thereof when the electronic host device has been stolen is provided. The method comprises: capturing, in a memory of the electronic host device, a sequence of screen displays corresponding to a window displayed on a display of the electronic host device, each screen display captured in response to an action performed by a user of the electronic host device; generating a compressed representation of the sequence of screen displays, said compressed representation generated, at least in part, by comparing, by execution of instructions by the electronic host device, individual screen displays to identify redundant information; and, transmitting the compressed representation of the sequence of screen displays over a network from the electronic host device to a monitoring system.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the drawings, like reference numerals designate like or similar steps or components.

DETAILED DESCRIPTION OF THE PREFERRED EMBODIMENTS

Figure 1:
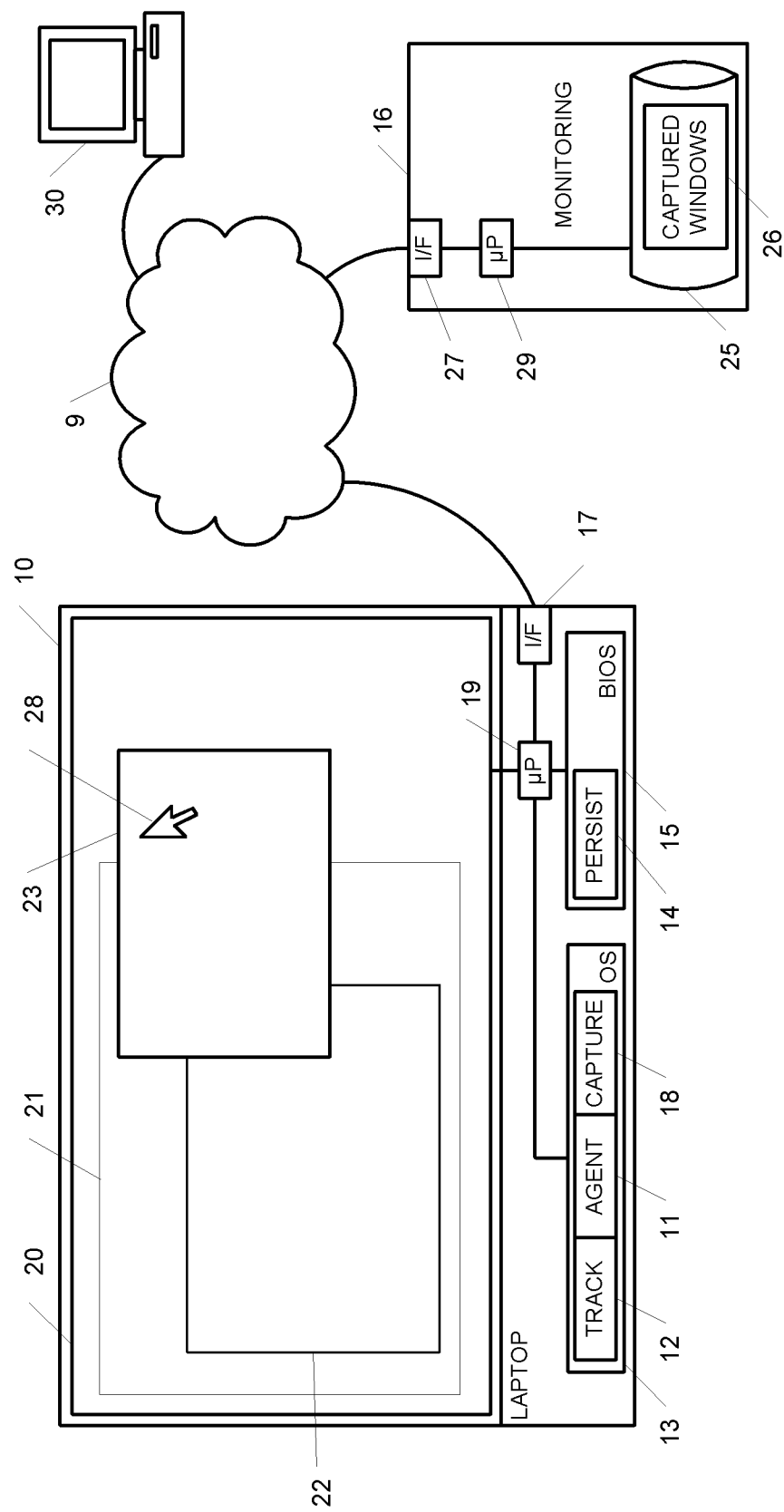
FIG. 1 is a schematic functional block diagram of a system and method for the conditional capture of screenshots in accordance with an embodiment of the disclosed subject matter.

Terminology:

Agent—as used herein, is a software, hardware or firmware agent that is ideally persistent and stealthy, and that resides in a computer or other electronic device. The agent provides servicing functions which require communication with a monitoring centre or remote server. The agent is preferably tamper resistant and may be enabled for supporting and/or providing various services such as data delete, firewall protection, data encryption, location tracking, message notification, and software deployment and updates. An illustrative embodiment of an agent is found in the commercially available product Computrace Agent™. The technology underlying the Computrace Agent™ has been disclosed and patented in the U.S. and other countries, which patents have been commonly assigned to Absolute Software Corporation. See, for example, U.S. Pat. Nos. 5,715,174; 5,764,892; 5,802,280; 6,244,758; 6,269,392; 6,300,863; and 6,507,914; and related foreign patents. Details of the persistent function of an agent are disclosed in U.S. Patent Application Publication Nos. US2005/0216757 and US2006/0272020. The technical disclosures of these documents are fully incorporated by reference as if fully set forth herein. It is feasible to use an equivalent agent to the Computrace Agent™, or less preferably an alternative agent with less functionality. For the purposes of the present disclosure, the minimal functional attributes of the agent are: (1) to communicate with a monitoring center; and (2) to control in part the functioning of a computer or electronic device in which it is installed. Ideally, the agent also has the ability to self-repair. Communications may be initiated by the agent, by the monitoring center or by both.

Host—this is the electronic device which is to be protected by an agent and/or the capture module in the presently disclosed subject matter.

Monitoring Center or Monitoring System—This is a guardian server or other computer or server that the agent communicates with or sends a message to. It may be an email server or a distribution of servers or other computers, and may refer to an office comprising such servers together with staff that can take telephone calls and/or investigate data communicated from the host to the monitoring centre. For example, provided an internet connection is available to the host, an agent may call the monitoring center once a day (or at some other selected suitable interval) to report the location of the host and download software upgrades if there are any. In the subject matter disclosed herein, the agent would upload to the monitoring center location information and/or any other data desired to be transferred. Communication to the monitoring center may take place, for example, via a wired or wireless telephone network, WIFI, WIMAX, cable or satellite.

The detailed descriptions within are presented largely in terms of methods or processes, symbolic representations of operations, functionalities and features of the disclosed subject matter. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions. Programming instructions used for implementing embodiments of the disclosed subject matter may be defined in one or more languages such as C++, Basic, Java, or variations of these. In general, unless otherwise indicated, singular elements may be in the plural and vice versa with no loss of generality. The use of the masculine can refer to masculine, feminine or both.

Exemplary Embodiment:

A schematic functional block diagram of a system and method for the conditional capture of screenshots in accordance with a preferred embodiment is illustrated in FIG. 1. An electronic host device, such as a laptop computer 10, comprises an agent 11 which can communicate regularly, approximately regularly, randomly, semi-randomly or according to triggers, to a remote monitoring centre 16 via the internet 9, or via some other telecommunications network. SMS messaging can be used for all or some of the communications; for example, an SMS message may be used to initiate communication, following which data is transferred using a different communications protocol or link. Communications may be initiated by either the laptop 10 or the monitoring centre 16.

The agent 11 running in the operating system 13 of the laptop 10 may be supported by a persistence module 14 stored in the BIOS 15, or other suitable location in the laptop. The persistence module 14 is able to communicate with the monitoring centre 16 before the operating system 13 is up and running, and is able to replace or repair the agent 11 if it becomes compromised in any way. The agent 11 is typically, but not necessarily, linked to a tracking module 12, which can provide location information that the agent can communicate to the monitoring centre 16. The agent 11 may alternately be located in a processor or other chip in the laptop 10.

In the presently disclosed embodiment, a capture module 18 is used to capture information displayed on the display screen 20 of the laptop. A microprocessor 19 in the laptop carries out computer readable instructions that are stored in memory, and that form at least part of the capture module 18. Information on the screen 20 is communicated through the interface 17 of the laptop 10, via a communications network 9 to communications interface 27 of monitoring centre 16. On the screen 20, there may be more than one window 21, 22 and 23 open. As a result of a mouse click, touchpad click, double click or via some other pointing device or user input interface, the window 23 over which the cursor 28 is positioned, comes under focus. Other ways to bring a window into focus depend on the configuration of the laptop 10 and its operating system 13, and include "follow focus", for example. The capture module 18 stores a partial screen shot corresponding to the area of the screen covered by the window 23 in focus, and the agent 11 transmits the captured window shot to the monitoring centre 16. At the monitoring centre 16, the microprocessor 29 stores the captured window shot 26 in electronic memory 25.

Each time a key on the laptop keyboard is pressed, or as each further click is made, a copy of the window in focus (i.e., the "active" window) can be made, and transmitted to the monitoring centre 16. A copy of the window may also be made on the release of a click and drag operation.

At a later time, or in almost real time, an investigator can retrieve the files (including captured window shots 26, as further discussed below) from electronic memory 25 using input/output terminal 30, such as a desktop computer, connected via the internet 9 to the monitoring centre 16. Alternately, the terminal 30 may be connected directly to or be part of the monitoring centre 16.

Figure 2:
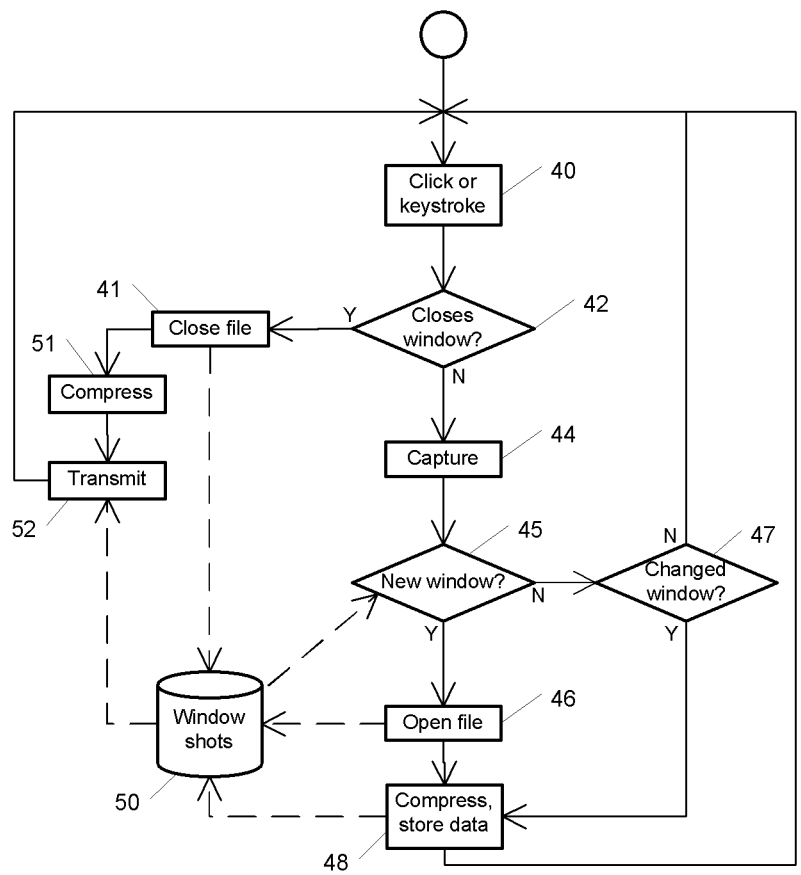
FIG. 2 is a functional flow diagram schematically representing the flow process of a system in accordance with an embodiment of the disclosed subject matter.

FIG. 2 is a functional flow diagram that illustrates an exemplary process carried out by the capture module 18. The capture module 18 is initiated by an instruction sent from the monitoring centre 16 to the agent 11. This instruction is sent when or after an owner or user of the laptop 10 reports its theft to the monitoring centre 16. The instruction may be sent via an internet connection or a wireless communications network. The agent 11 may alternately initiate the capture module 18 after detecting tampering or unusual behaviour of a user of the laptop 10, or after receiving a signal from a security module within the laptop 10. For example, the capture module 18 may be triggered after the detection of a certain number of failed password entry attempts, or when the agent 11 determines that the laptop is located outside a prescribed usage area or is connected to an unauthorized Internet Service Provider. After the process has been initiated, an event 40 (such as a mouse click, touchpad click, keystroke or other equivalent selection initiated by the user) occurs. If this action does not result in the closing of a window, step 42, then a graphical representation of the window in focus is captured 44.

An event 40 (such as an onclick event) can trigger the capture 44 of the attributes of the window 23 that is in focus, such as its name; screenX and screenY, which give the location in pixels of the window on the display screen relative to the top left corner of the screen; and width and height, which give the outer dimensions of the window in pixels. There are other attributes that may be captured and made use of for increased efficiency, such as innerheight and innerwidth, which give the dimensions of the content area of the window, and attributes indicating the border width and size of the title bar if any. For example, it is more efficient to transmit images of the content area of a window than the whole window including border and title bar.

If it is a new window that is captured, step 45, then a file is opened 46 and stored in electronic memory 50 in the host (e.g. laptop 10). This file is for storing partial screen shots of ideally only the specific window for which it was opened. In step 48, making use of the position and size of the window, a data representation of an image of the window is stored in the corresponding file in memory 50. The image may optionally be compressed before storing.

If the window that is captured in step 44 is not a newly opened window 45, then the system compares 47 the captured window with the immediately preceding record of the window. If the captured window has not changed since its previous capture, then the latest capture is discarded and the system loops back to the start and waits for the subsequent event 40. If the captured window has changed since it was last captured, then it is stored 48 in its corresponding file in memory 50 for transmission to the monitoring centre 16. Changes may include, but are not limited to, the typing of text into a textbox within the window, the pasting of text, the selection of an option or the resizing of the window. In preferred embodiments, a change in the position of the window does not count as a change. The system then cycles back to the start and waits for the subsequent event 40.

If the event 40 results in the closure of a window 42, then the open file in memory 50 corresponding to the window is closed 41, optionally compressed 51, and then transmitted 52 to the monitoring centre. The file may be transmitted all at once or in parts, and/or it may be transmitted after a delay. Transmission is configured so as not to alert the user that anything out of the ordinary is occurring.

The window shots may be stored as compressed image files, and may be converted to grey scale or black and white to reduce their memory footprint. They may also or alternatively be reduced in resolution, either entirely or for one or more partial area(s), and resolution may be reduced by different amounts for different parts of the window shot. Compression may be lossy or lossless, and examples of image formats used include but are not limited to JPEG, GIF, and TIFF. The window shots may be date and time stamped so that they can more readily be viewed in sequence.

Compression may be varied in time. For example, the first screen captured may be high resolution and all subsequent screens may be low resolution. The initial screen may be captured in full colour and all subsequent screens in black and white, or grayscale. If a change in the window or screen is relatively large, then the compression may be temporarily relaxed to obtain a high resolution image, followed by a sequence of low resolution images. Delta encoding (also known as delta compression or differential compression) may also be used.

Alternately, the window shots may be compiled into a compressed video file/container format such as MP4 or AVI. Each window shot represents a frame in the video, so that the video that is reproduced does not in most cases follow the true relative timing of events that occurred in the window. This allows the window and the actions within the window to be reviewed more efficiently. If a specific time of an event is needed, the time stamp for a particular frame can be consulted.

Alternatives and Variations:

Steps may be performed in a different order to that illustrated, or they may be combined where shown separately. Depending on the particular embodiment implemented, one or more of the steps or features described above may be omitted without departing from the core scope of the disclosed subject matter.

A pause can be incorporated into the process between an event and its associated window capture, for example, to allow for new web pages to reload as a result of a double click. If a further keystroke is made while waiting for the window to load, then a condition can be made to allow the process to split into two threads, so that both the new content in the window is captured as well as the keystroke. The number of threads could be limited, or preceding threads could be abandoned in favour of the most recent click or keystroke.

Additional compression techniques may be used to further reduce the bandwidth for transmitting still images. For example, as well as an individual window shot being compressed, two or more consecutive window shots may be compressed as a group.

Figure 3:
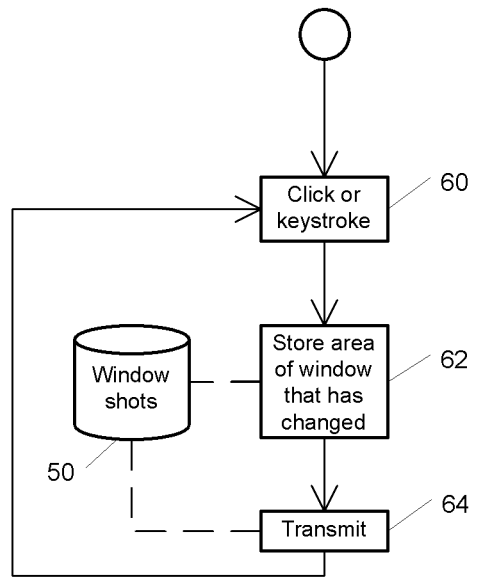
FIG. 3 is a functional flow diagram schematically representing the flow process of a system in accordance with an alternate embodiment of the disclosed subject matter.

A further alternative would be to transmit only the area of the window that has changed since the preceding window shot. For example, the smallest rectangular area containing the pixels that have changed, and coordinates defining the location of the area relative to a given corner of the window may be stored and transmitted. The size of the rectangle could be variable or fixed. FIG. 3 illustrates such a process, which may form part of the overall process described herein. After an event 60 has occurred in a window that is in focus, the system stores 62 the part of the window that has changed. If it is the opening of a window, then the whole or the majority of the window is stored. If the window has changed since the preceding event, then the area of the window that has changed is stored 62. Window shots can be temporarily stored in a local data store 50 in the laptop 10 or other electronic device that is protected. The window shots are then transmitted 64, either as they are captured, or in bulk. The process reverts back to step 60 when a subsequent click or keystroke is detected.

If there are multiple windows open on the laptop, the capture module can be configured to keep a file open for each of the windows, appending to the each file as and when the corresponding window shot changes. When the window is closed, the file can be closed and transmitted. If the file reaches a certain size, the file may be closed while the window is still open and another file started, to avoid large files which are harder to manage and transmit than smaller ones.

As well as making separate files for each window, separate files may be made for each website visited in a browser, and optionally, files could only be recorded for those websites where there were alphanumeric keystroke entries. Alternately, only those websites could be recorded where there are over a predetermined number of keystrokes or clicks or a predetermined number of a particular type of keystroke or click.

As well as capturing the window shots, the actual key presses can be recorded and stored in a file which is associated with the corresponding window shot file. Depending on available bandwidth and connectivity, the keystroke file, typically being much smaller than the window shot file, can be transmitted first. The benefit of this compared to a capture-all keystroke logging program is that the information has been filtered to be relevant to a specific window. Another benefit is that the transfer of the smaller keystroke file is likely to be more successful than the transfer of the larger, graphics or video file. The benefit of having the two files upon successful transfer of them both is that the investigator can use each to facilitate the study of the other. In alternate embodiments, the window shots and keystrokes may be stored in the same file, and/or a single file could be used to capture screen shots and/or keystrokes associated with multiple windows.

An embodiment which would be easier to implement, but would not be as economical with bandwidth usage, would involve taking entire screen shots rather than partial screen shots of the window in focus.

Another embodiment would be to create files corresponding to each input box within a form displayed in a browser window. The names of the form and the input can be retrieved from the source file and saved, and all keystrokes associated with that input box. Again, an advantage of this is that the keystroke file would be pre-filtered compared to a blanket keystroke capture program. A blanket keystroke capture program would record all keystrokes in order of striking them, irrespectively of the window or input box they were struck in. This results in a jumbled line of characters depending on how often the user changed the focus, moved the cursor and made typing mistakes. The files would be preferably captured as text files for lower bandwidth transmission, but could instead be captured as mini image or video files. Video, or ordered images files are better than keystroke files because the investigator can see the effect of typing corrections directly, without having to decipher them from a keystroke file.

The capture module 18 may be a standalone module, or it may be incorporated within the agent 11. Alternately, the agent 11 may be incorporated within the capture module 18.
Exemplary Rules:

The following are summary examples of rules that can be used for the capture of window shots and/or keystrokes. All or an appropriate combination of these rules may be embodied in the capture module 18. These rules can be combined or modified to suit the particular embodiment of the system desired.

A—Capture the whole screen at every keystroke, click or double click.

B—Capture the window in focus at every keystroke, click or double click.

C—Capture an image of the input box in focus at every keystroke, click or double click.

D—Determine the screen location of the pointing device when clicked and capture a predefined area around this point. Capture the same area for every subsequent keystroke, or a predetermined number of keystrokes. Alternately, move the area as the cursor moves.

E—Capture images in separate files, each file being associated with a window or input box.

F—Limit the maximum permissible size of an image capture file. Use multiple files for the same window where necessary.

G—Capture the keystrokes in separate files, where each file corresponds to a separate window. Alternately, each file could correspond to a single input box or form.

H—Only capture and transmit screens, windows or input boxes that have changed.

I—Convert full colour images to grey scale images.

J—Decrease resolution in whole, in part or variably.

K—Capture each keystroke and its associated cursor position (before or after the stroke) in terms of screen coordinates. Include mouse clicks, which include the amount of scroll, either left, right, up or down. Include selections and associated screen coordinates defining the extent of the selections.

Except where indicated otherwise, all of the steps and tasks described herein may be performed and fully automated by a computer system, and may be embodied in software code modules executed by one or more general purpose computers. The code modules may be stored in any type of computer-readable medium or other computer storage device. Some or all of the methods may alternatively be embodied in specialized computer hardware. The computer system may, in some cases, be composed of multiple distinct computers or computing devices (e.g., physical servers, workstations, storage arrays, etc.) that communicate and interoperate over a network to perform the described functions. Each such computing device typically includes a processor (or multiple processors) that executes program instructions stored in a memory or other computer-readable medium. The results of the disclosed methods may be persistently stored by transforming physical storage devices, such as solid state memory chips and/or magnetic disks, into a different state.

The present description includes the best presently contemplated mode of carrying out the subject matter disclosed and claimed herein. The description is made for the purpose of illustrating the general principles of the subject matter and not be taken in a limiting sense; the subject matter can find utility in a variety of implementations without departing from the scope of the disclosure made, as will be apparent to those of skill in the art from an understanding of the principles that underlie the subject matter.

What is claimed is:

1. A method performed by an electronic host device to facilitate recovery thereof when the electronic host device is stolen, the method comprising:
   capturing, in a memory of the electronic host device, multiple sequences of screen displays, each sequence corresponding to a different window displayed on a display of the electronic host device, each screen display captured in response to an action performed by a user of the electronic host device;
   generating a compressed representation of each sequence of screen displays; and
   transmitting the compressed representations of the sequences of screen displays over a network from the electronic host device to a computer system;
   wherein said capturing comprises:
      keeping a respective file open for each of the windows, and updating the respective file with screen display data captured from the corresponding window when a screen display of the corresponding window changes; and
      in response to a first of said files reaching a predetermined size, closing the first file while the corresponding window is still open and starting a new file for said corresponding window.

2. The method of claim 1, wherein transmitting each compressed representation comprises transmitting the closed first file while the corresponding window is still open.

3. The method of claim 1, further comprising closing a second of said files in response to the window corresponding to said second file being closed.

4. The method of claim 1, wherein a plurality of files is kept open for one of the windows, each of said plurality of files corresponding to a different website accessed via said one window.

5. The method of claim 1, wherein transmission of a compressed representation is started in response to closure of a corresponding window.

6. The method of claim 1, further comprising, by execution of instructions by the electronic host device, logging, and transmitting to the computer system, keystrokes detected on the electronic host device.

7. The method of claim 6, wherein the keystrokes are recorded in one or more files which are different from the files corresponding to the windows.

8. The method of claim 1, wherein the method is performed in response to the electronic host device receiving, over a network, a message generated in response to a reported theft of the electronic host device.

9. The method of claim 1, wherein the method is performed in response to detection of a threshold number of unsuccessful password entry attempts on the electronic host device.

10. The method of claim 1, further comprising, by execution of instructions by the electronic host device, transmitting location information to the computer system, said location information reflecting a current location of the electronic host device.

11. The method of claim 1, wherein said capturing, generating and transmitting are performed by the electronic host device under control of executable instructions that run on the electronic host device in a stealth mode.

12. The method of claim 11, wherein the executable instructions comprise a module that is operative to begin running on the electronic host device at startup, before an operating system of the electronic host device begins running.

13. The method of claim 1, wherein capturing the sequences of screen displays comprises:
    detecting a click or keystroke action performed by the user in a first window;
    determining whether the click or keystroke action caused the first window to become closed; and
    in response to determining that the click or keystroke action did not cause the first window to become closed, generating a screen capture corresponding to the click or keystroke action.

14. The method of claim 13, further comprising:
    detecting a subsequent click or keystroke action that causes the first window to become closed; and
    in response to determining that the subsequent click or keystroke action caused the first window to become closed, initiating said transmission of a file corresponding to the first window.

15. The method of claim 1, wherein each screen display is captured in response to a respective user action performed on the electronic host device by a user whose actions are being monitored by executable software that runs on the electronic host device in a stealth mode.

16. A non-transitory computer-readable medium which stores executable instructions that direct an electronic host device to perform a method for facilitating recovery of the electronic host device when the electronic host device is stolen, the method comprising:
    concurrently maintaining open on the electronic host device at least a first file that corresponds to a first window and a second file that corresponds to a second window;
    updating the first file with window shot data captured from the first window in response to user actions that cause a display in the first window to change;
    updating the second file with window shot data captured from the second window in response to user actions that cause a display in the second window to change; and
    in response to the first file reaching a threshold size, and while the first window remains open:
        closing the first file and transmitting the first file on a computer network to a computer system, to thereby communicate to the computer system a representation of a sequence of window shots taken from the first window; and
        opening a third file that corresponds to the first window.

17. The non-transitory computer-readable medium of claim 16, wherein the representation of the sequence of window shots is compressed.

18. The non-transitory computer-readable medium of claim 16, further comprising closing and transmitting the second file in response to the second window being closed.

19. The non-transitory computer-readable medium of claim 16, wherein the first file is one of a plurality of files maintained open for said first window, each of said plurality of files corresponding to a different respective website accessed via the first window.

20. The non-transitory computer-readable medium of claim 16, wherein the method comprises capturing an initial window shot of the sequence at a first resolution, and capturing at least one subsequent window shot of the sequence at a second resolution that is lower than the first resolution.

21. The non-transitory computer-readable medium of claim 16, wherein updating the first file comprises:
    detecting a click or keystroke action performed by the user in the first window;
    determining whether the click or keystroke action caused the first window to become closed; and
    in response to determining that the click or keystroke action did not cause the first window to become closed, generating a window shot corresponding to the click or keystroke action.

\* \* \* \* \*